United States Patent Office

2,789,044
Patented Apr. 16, 1957

2,789,044

METHOD OF DESTROYING VEGETATION

Walter E. Steinmetz, Oak Park, Ill., assignor to National Aluminate Corporation, Chicago, Ill., a corporation of Delaware No Drawing. Application April 17, 1953,
Serial No. 349,573

11 Claims. (Cl. 71—2.7)

This invention relates to a method of destroying vegetation and to new and improved herbicidal compositions.

Many of the compounds which are known to have a herbicidal activity are more or less selective in their action. Thus there are a number of growth-regulating substances or plant hormones which when applied to vegetation are capable of destroying many dicotyledonous species. The amount of herbicide necessary to destroy a broadleaf plant specie, however, is generally insufficient to retard the growth of most monocotyledonous plants. Many of the known herbicides are also insoluble in water and therefore difficult to apply in an aqueous medium. The use of an oil carrier or solvent for the herbicidal compound is sometimes undesirable because where it is desired to remove weeds or grass from growing vegetation of other types, the oil itself may be harmful to the growth of the vegetation which is under cultivation.

Another disadvantage of many of the known herbicides is that they are only temporarily effective. In other words, the period of time during which the plant growth is destroyed or retarded is of relatively short duration.

One of the objects of the present invention is to provide a new and useful herbicidal composition which is especially effective in destroying or retarding the growth of a number of different types of grasses.

A further object of the invention is to provide a herbicidal composition which is effective in destroying many types of vegetation and in substantially retarding the regrowth of the same vegetation over a relatively long period of time.

An additional object of the invention is to provide a new and improved method of destroying and/or controlling the growth of vegetation, especially certain types of grasses.

A further object of the invention is to provide a method of destroying and/or controlling the growth of grasses and other vegetation along highways and railroad right-of-ways.

Another object of the invention is to provide new and improved herbicidal compositions containing a plurality of compounds which exhibit herbicidal activity for different types of vegetation and are compatible with each other.

A further object of the invention is to provide herbicidal compositions in which the active essential ingredients destroy grasses and certain other types of vegetation but do not destroy corn. Other objects will appear hereinafter.

In accordance with the invention it has been found that new and improved results in the destruction of vegetation are obtained by treating the growing vegetation or the ground prior to the emergence of the vegetation with a halogenated pentadienoic acid or a salt, amide or ester thereof, the number of carbon atoms connected together preferably being not greater than six, sequentially.

Examples of the compounds employed in accordance with the invention are:

(1) Pentachloropentadienoic acid, its trans and cis forms, having the formula $$\text{C(Cl)=C(Cl)-C(Cl)=C(Cl)-C(O)-OH}$$
with Cl substituent (2) Ethyl pentachloropentadienoate having the formula $$\text{C(Cl)=C(Cl)-C(Cl)=C(Cl)-C(O)-OC}_2\text{H}_5$$
with Cl substituent (3) Amide of compound (1) having the formula $$\text{C(Cl)=C(Cl)-C(Cl)=C(Cl)-C(O)-NH}_2$$
with Cl substituent (4) Butoxyethoxyethanol ester of compound (1) having the formula $$\text{C(Cl)=C(Cl)-C(Cl)=C(Cl)-C(O)-O-CH}_2\text{-CH}_2\text{-O-CH}_2\text{-CH}_2\text{-O-C}_4\text{H}_9$$
with Cl substituent (5) Cyclohexylpentachloropentadienoate having the formula $$\text{C(Cl)=C(Cl)-C(Cl)=C(Cl)-C(O)-O-C}_6\text{H}_{11}$$

(6) 5-bromo-2,3,4,5-tetrachloropentadienoic acid having the formula $$\text{C(Br)(Cl)=C(Cl)-C(Cl)=C(Cl)-C(O)-OH}$$

(7) The sodium, potassium and ammonium salts of compounds 1 and 6.

(8) The salts of compounds 1 and 6 with basic amines, preferably primary and secondary amines (e. g., methylamine, dimethylamine, ethylamine, diethylamine, propylamine, dipropylamine, isopropylamine, diisopropylamine, butylamine, dibutylamine, amylamine, diamylamine, hexylamine, dihexylamine, ethylene diamine, propylene diamine, diethylene triamine, triethylene tetramine, tetraethylene pentamine, dipropylene triamine, ethanolamine, diethanolamine, hydroxyethylethylene diamine and homologues thereof).

Since the amounts of the active ingredient required for the purpose of the invention are relatively small, it is essential as a practical matter to incorporate it in a carrier in order to distribute it in the required amounts on the ground or on the vegetation to be treated. Satisfactory results have been achieved by employing as the carrier oils or other liquids in which the active ingredient is soluble or dispersible. The active ingredient may also be employed in conjunction with a solid carrier, e. g., as a dusting powder, but for most practical applications a liquid carrier is preferred. The carrier may be a solvent for the active ingredient or the active ingredient may be suspended in the liquid carrier. The free acids, amides, esters are soluble in oil and other hydrophobic solvents. The alkali metal and ammonium salts and the salts of water soluble amines are soluble in water and other hydrophilic solvents. In some cases, the active herbicidal compounds are more effective in one type of carrier than in another.

The invention will be illustrated but is not limited by the following examples.

Example I

About 3960 grams of octochlorocyclopentene were charged to a 12 liter three-necked flask which was immersed in an oil bath. To it was added 3800 grams of concentrated sulfuric acid (2060 ml.) while stirring. The temperature was raised to about 105° C. ±5° C. and kept there for about nine hours until no more hydrogen chloride bubbles were seen rising from the reaction mixture. The product was cooled to room temperature and was noted to consist of two layers. The oily upper layer, crude hexachlorocyclopentenone, was separated, washed with water, saturated sodium chloride solution and again with water. Hexachlorocyclopentenone dissolved in the lower layer was removed therefrom by pouring this layer into large amounts of ice water. The oil thus obtained was purified as above.

The products thus obtained were combined and were slowly added with stirring to 27,450 ml. of potassium hydroxide solution which contained 2745 ml. of 45% KOH. When the oil had all dissolved the solution was slowly poured into an excess amount of dilute hydrochloric acid (3:1) with rapid stirring. Fine crystals with a melting point of 124 to 125° C. (uncorrected) were obtained. The reactions involved in this synthesis may be expressed in the following manner:

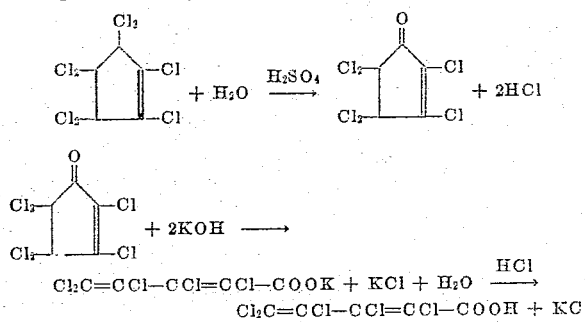

The final product corresponds to compound 1.

Example II

One mole of the product of Example I was refluxed with 100% ethanol saturated with hydrogen chloride gas, the amount of ethanol being in excess of one mol. The reaction was carried out for nine hours after which the excess ethyl alcohol was removed by distillation. The crude ester was washed with sodium bicarbonate solution and dried over anhydrous sodium sulfate. The sodium bicarbonate solution removes any unreacted free acid. The final product was a water white liquid having a chemical formula corresponding to that of compound 2 and distilled at 120° C.–125° C. at a pressure of 200 to 250 mm. of mercury.

Example III

Hexachlorocyclopentenone was slowly added to cold concentrated ammonium hydroxide, the quantity of the ammonium hydroxide being in excess of the amount required theoretically to form the amide. The amide precipitated from the solution and crystallized as a white compound melting at around 113° C. to 114° C. This compound corresponds to compound 3.

Example IV

The butylcarbitol ester of pentachloropentadienoic acid was prepared by refluxing butylcarbitol and the acid in equimolar proportions in a Dean and Stark apparatus in the presence of sufficient benzene to permit azeotropic distillation. The refluxing was continued until the theoretical amount of water required for ester formation was obtained. The benzene was then distilled off and the residual oil washed with a sodium bicarbonate solution to remove unreacted acid. The final product corresponds to compound 4 and is a very high boiling dark brownish liquid which is stable at ordinary temperatures but decomposes upon attempted distillation.

Example V

Compound 5 was prepared by refluxing compound 1 for seven hours with an excess of thionyl chloride over the quantity theoretically required to convert compound 1 to the acid chloride. After the excess thionyl chloride had been removed by distillation and the residue cooled, cyclohexanol in the quantity theoretically required to form the cyclohexyl ester was added and the resultant reaction mixture heated at 100° C. until the evolution of hydrogen chloride ceased. The reaction product was then cooled, washed with water and washed with sodium bicarbonate solution until the washings were basic. The ester layer was separated and dried over anhydrous sodium sulfate. The end product was a dark brown liquid which was stable at room temperature but decomposed when attempts were made to distill it. The product corresponds to compound 5.

Example VI

Two hundred ninety-five (295) grams of potassium hydroxide were dissolved in 1290 ml. of absolute methanol. To this solution there was added slowly 550 grams of hexachlorocyclopentadiene dissolved in 1730 ml. of absolute methanol. In order to keep the solution from becoming too warm, the addition was made over a period of 2½ hours. The reaction mixture was diluted with 7 liters of water and the organic layer was separated. The organic layer was then washed with 200 ml. of water and dried over anhydrous sodium sulfate. The dried material was fractionated and the fraction boiling at 105° C. to 109° C. at 3 mm. pressure was collected. This is an intermediate product, namely, 5,5-dimethoxy-1,2,3,4-tetrachlorocyclopentadiene.

Three hundred (300) grams of bromine were added to a solution of 417.3 grams of the above intermediate product in 700 ml. of dry carbon tetrachloride. The solution was allowed to stand at 20° C. for 21 hours. The reaction mixture was heated on a steam bath at about 100° C. to remove the carbon tetrachloride and excess bromine. The residue was slowly poured into 1600 grams of 96% sulfuric acid while cooling to maintain a temperature not to exceed 30° C. The resultant reaction mixture was poured onto cracked ice and the organic layer separated. The separated layer was washed with cold water and treated with 1400 ml. of 10% by weight potassium hydroxide solution. After stirring for 30 minutes the solution was filtered to remove the material that did not dissolve and then acidified with 6 N hydrochloric acid until distinctly acid (pH 4 to 5). The free acid corresponding to compound 6 separated as a dark brown oil which solidified on standing. The solid was collected on a filter and recrystallized from carbon tetrachloride. It melted at approximately 114° C. to 117° C.

Example VII

The inorganic salts of compounds 1 and 6 are prepared by mixing the free acids with inorganic bases, for example, sodium hydroxide, sodium bicarbonate, potassium hydroxide and ammonium hydroxide in equimolar proportions.

Example VIII

The amine salts of compounds 1 and 6 are prepared by mixing the free acids with any of the amines listed under compound 8.

Example IX

This example illustrates the evaluation of the invention in destroying vegetation. An area was selected for testing which was primarily infested with Bermula grass but also contined varying amounts of para, horquetilla and nutgrass. The area was divided into 5 rows of plots, each plot 6 feet long and 3 feet wide. The plots were numbered by selection of numbers from a table of randomized numbers. There were 5 replications of each treatment, so for 27 treatments there were 135 plots.

Each chemical was applied at the desired rate with a Knapsack sprayer at 40 pounds per square inch pressure. The solutions were sprayed within a plywood frame 18 inches high to prevent drifting of material to adjacent plots.

The plots were examined at frequent intervals and stand data was taken at the end of 4 to 6 weeks.

The compositions applied to the various plots were as follows:

| Plot Number | Composition and Rate of Application of Active Ingredient | Observations after One Week |
|---|---|---|
| 1 | 50 lbs. Compound (1)/acre, 17.1 lbs. NaHCO₃/acre dispersed in 40-80 gallons water/acre. | 99% total kill. |
| 2 | 25 lbs. Compound (1)/acre, 85 lbs. NaHCO₃/acre dispersed in 40-80 gallons water/acre. | 95% total kill but some Bermuda and para grass regrowth. |
| 3 | 10 lbs. Compound (1)/acre, 2.7 lbs. NaHCO₃/acre dispersed in 40-80 gallons water/acre. | 20% total kill but heavy nutgrass and para grass regrowth. |
| 4 | 50 lbs. Compound (1)/acre dispersed in 40-80 gallons mineral seal oil/acre. | 100% total kill. |
| 5 | 25 lbs. Compound (1)/acre dispersed in 40-80 gallons mineral seal oil/acre. | Do. |
| 6 | 10 lbs. Compound (1)/acre dispersed in 40-80 gallons mineral seal oil/acre. | 98% total kill but nutgrass regrowth. |
| 13 | 50 lbs. Compound (2)/acre dispersed in 40-80 gallons mineral seal oil/acre. | Do. |
| 14 | 25 lbs. Compound (2)/acre dispersed in 40-80 gallons mineral seal oil/acre. | Do. |
| 15 | 10 lbs. Compound (2)/acre dispersed in 40-80 gallons mineral seal oil/acre. | 95% total kill but nutgrass regrowth. |
| 16 | 50 lbs. Compound (6)/acre, 14.6 lbs. NaHCO₃/acre dispersed in 40-80 gallons water/acre. | 90% total kill but para and nutgrass regrowth. |
| 17 | 50 lbs. Compound (6)/acre dispersed in 40-80 gallons mineral seal oil/acre. | 100% total kill. |
| 26 | 25 lbs. Compound (3)/acre dispersed in 40-80 gallons mineral seal oil/acre. | 98% total kill but para and nutgrass regrowth. |

After 4 weeks it was observed that compound 2 at 50 lbs. per acre (plot 13) was the second most effective of 27 different formulations tested. It was still very effective at 25 lbs per acre, ranking fourth. Compound 6 ranked eighth. Compound 1 (plots 4, 5, and 6), ranked seventh, ninth and eleventh, while compound 3 ranked fifteenth.

Plots 13 and 14 showed excellent destruction of the grasses from the beginning. In plot 4 the destruction was only fair at first but increased. Plot 15 showed excellent destruction for three weeks but fell off suddenly. These chemicals were tested and also found to be equally effective in destroying other grasses besides Bermuda grass.

It will be observed in the foregoing tests that the active effective ingredient in plots 1, 2 and 3 is the sodium salt of pentachloropentadienoic acid which is formed by the reaction of the free acid with sodium bicarbonate. In plots 4, 5 and 6, the active effective ingredient is pentachloropentadienoic acid. This compound dissolves readily in mineral seal oil. In plots 13, 14 and 15 the active effective ingredient is ethylpentachloropentadienoate. In plot 16 the active effective ingredient is the sodium salt of 5-bromo-2,3,4,5-tetrachloropentadienoic acid. In plot 17 the active effective ingredient is 5-bromo-2,3,4,5-tetrachloropentadienoic acid. In plot 26 the active effective ingredient is the amide of pentachloropentadienoic acid.

*Example X*

Plots similar to those in Example IX but of larger area (200 square feet) were prepared and herbicidal compositions were applied in a solvent equivalent to 60 gallons per acre. The results were as follows:

| Plot Number | Composition and Rate of Application of Active Ingredient | Observations after Four Days |
|---|---|---|
| 1 | Sodium salt of Compound (1), 25 lbs./acre dispersed in water. | 95-98% total kill. |
| 2 | Compound (1), 25 lbs./acre dispersed in mineral seal oil. | Do. |
| 4 | Compound (1), 25 lbs./acre dispersed in shell aromatic oil, together with 2.5 lbs./acre of isopropyl ester of 2,4-dichlorophenoxy acetic acid. | Do. |
| 5 | Compound (2), 25 lbs./acre dispersed in mineral seal oil. | 70-75% total kill. |
| 10 | Sodium salt of Compound (6), 25 lbs./acre dispersed in water. | 80% total kill. |

After one month plots 2 and 5 showed an 80-85% total kill on Bermula grass and plot 4 had a 70 to 75% total kill on Bermula grass.

*Example XI*

Tests were conducted on plots containing approximately 5% broadleaf plants (bindweed, fleabane) and 95% quack and blue grass for a period of approximately 4 months with the butylcarbitol ester of pentachloropentadienoic acid applied at a rate of 50 lbs. per acre in 40 to 80 gallons per acre of a highly aromatic oil. The results showed 95% kill after a one week which decreased slowly to 40% grass kill after 4 months. The kill was over 80% for more than 2 months. At 25 lbs. per acre of the active ingredient, the kill was 75% or over for one month and then decreased steadily to 40% kill after 4 months.

*Example XII*

Comparative tests were made with pentachloropentadienoic acid and ethyl pentachloropentadienoate by applying them in various proportions to plots which had been planted with corn, pidgeon peas and velvet beans. The pentachloropentadienoic acid was applied at rates of 10, 25 and 50 lbs, per acre and the ethyl pentachloropentadienoate was applied at 10, 50 and 100 lbs. per acre just after planting and before any crop or weed growth.

Both compounds caused severe injury to pidgeon peas and velvet beans. They were stunted and resembled plants attacked by virus diseases. Weed control was satisfactory except at 10 lbs. per acre.

The effect on corn was surprising. No damage occurred at any concentration used. The yield of corn actually increased with added quantities of the herbicidal composition.

*Example XIII*

Tests were conducted on Bermuda grass using varying concentrations of compound 2 and also mixtures of compounds 1 and 2 in comparison with trichloroacetic acid. At 25 and 50 lbs. per acre dosage compound 2 was superior to trichloroacetic acid at the same dosage. A mixture of 50 lbs. compound 2 and 8 lbs. compound 1 per acre was far superior to 50 lbs. of trichloroacetic acid per acre. A mixture of 50 lbs. trichloroacetic acid and 8 lbs. compound 1 per acre was far superior to 50 lbs. of trichloroacetic acid per acre. These tests illustrated that the compounds of the present invention can be employed with each other or in conjunction with other herbicidal compounds.

It will be understood that the invention is not limited to the employment of the specific compounds disclosed in Examples I to IX. The methyl esters of compounds 1 and 6 can be prepared by reacting the free acids with the corresponding alcohol in the presence of an esterification catalyst as described in Example II. In a similar manner, isopropanol, butanol, amyl alcohol and hexyl alcohol can be substituted for the ethyl alcohol of Example II to produce the corresponding esters. The amides of Example III can have methyl, ethyl, propyl, isopropyl, butyl, amyl or hexyl groups attached to the amido nitrogen atom in place of one or more of the hydrogen atoms.

The active herbicidal ingredients can also be applied in the solid form mixed with a solid carrier. Typical carriers which may be employed are talc, borax, sand, granular clays or other suitable ingredients. The invention is not limited to the employment of any particular solvent or diluent as a carrier for the active herbicidal ingredient or ingredients. The solvent can be an aliphatic oil, such as mineral seal oil, or a highly aromatic oil. The glycols which are liquid at ordinary temperatures and the ethers thereof, such as butyl ether of diethylene glycol, can be employed alone or in conjunction with a hydrocarbon oil as a carrier for the active ingredient. It will be recognized that many other types of polyoxyalkylene glycols and ethers and esters thereof which are normally liquid, as well as hydrocarbon oils can similarly be employed as carriers.

In some cases, the solvent or diluent which is employed as the carrier has a contact or burning effect on the vegetation. This is especially true of the highly aromatic oils. However, this contact effect does not normally last more than two weeks and the lasting destruction of the vegetation is derived primarily from the action of the herbicidal ingredients of the composition. The contact effect is sometimes of value in that it produces a rapid destruction of the vegetation and enhances the reaction of the active ingredient in destroying, retarding or preventing the regrowth of the vegetation.

The quantities of the active ingredients which are employed in accordance with the present invention can be varied depending upon the results desired. A significant effect is obtained with quantities as low as two pounds per acre and good results have been obtained with proportions of 10 to 100 pounds per acre of the active herbicidal ingredients. In general, it is preferable to apply about 25 to about 50 pounds per acre of active herbicidal ingredients of the type herein described.

The quantity of the solvent or diluent should be sufficient to insure the application of the active herbicidal ingredient at the desired rate, and in most cases, 40 to 80 gallons per acre of the solvent or diluent will produce satisfactory results.

Wetting and dispersing agents can be added to herbicidal compositions of the type described herein in order to enhance the wetting effect and produce better dispersion of the active herbicidal material on the vegetation to which it is applied. It will be understood, however, that such auxiliary agents are not necessary and can be omitted in the practical application of the invention.

The compositions of the invention are especially useful in destroying or retarding the growth of certain types of vegetation, particularly grasses which are not normally affected by many of the known herbicides. An important advantage of the invention is the excellent residual effect obtained by applying the compositions of the invention in the destruction of vegetation. The invention also has advantages in the cultivation of cereals such as corn, in that the herbicidal compositions of the invention will destroy many grasses without retarding the growth of the corn. An important use for the herbicidal compositions of the invention is in treating the areas along highways and railroad right-of-ways where it is desired to destroy vegetation and retard its regrowth over a relatively long period of time.

The invention is hereby claimed as follows:

1. The method of destroying vegetation which comprises applying thereto a lethal concentration of a herbicidal composition containing as the essential active ingredient a compound from the group consisting of halogenated pentadienoic acid and salts, amides and esters thereof containing not more than 6 carbon atoms connected together sequentially.

2. The method of destroying vegetation which comprises applying thereto a lethal concentration of a herbicidal composition containing dispersed in a carrier a compound from the group consisting of halogenated pentadienoic acid and salts, amides and esters thereof containing not more than 6 carbon atoms connected together sequentially.

3. The method of destroying grasses which comprises applying thereto a lethal concentration of a herbicidal composition containing as the essential active ingredient a compound from the group consisting of halogenated pentadienoic acid and salts, amides and esters thereof containing not more than 6 carbon atoms connected together sequentially.

4. The method of destroying grasses which comprises applying thereto a lethal concentration of a herbicidal composition containing dispersed in a carrier a compound from the group consisting of halogenated pentadienoic acid and salts, amides and esters thereof containing not more than 6 carbon atoms connected together sequentially.

5. The method of destroying Bermuda grass which comprises applying thereto a lethal concentration of a herbicidal composition containing as the essential active ingredient a compound from the group consisting of halogenated pentadienoic acid and salts, amides and esters thereof containing not more than 6 carbon atoms connected together sequentially.

6. The method of destroying Bermuda grass which comprises applying thereto a lethal concentration of a herbicidal composition containing dispersed in a carrier a compound from the group consisting of halogenated pentadienoic acid and salts, amides and esters thereof containing not more than 6 carbon atoms connected together sequentially.

7. A method of controlling the growth of vegetation which comprises applying to the vegetation a growth inhibiting amount of a composition containing as an essential active ingredient pentachloropentadienoic acid.

8. A method of controlling the growth of vegetation which comprises applying to the vegetation a growth inhibiting amount of a composition containing as an essential active ingredient an alkali metal salt of pentachloropentadienoic acid.

9. A method of controlling the growth of vegetation which comprises applying to the vegetation a growth inhibiting amount of a composition containing as an essential active ingredient an ester of pentachloropentadienoic acid containing not more than 6 carbon atoms linked together in the ester group.

10. A method of controlling the growth of vegetation which comprises applying to the vegetation a growth inhibting amount of a composition containing as an essential active ingredient an amine salt of pentachloropentadienoic acid containing not more than 6 carbon atoms linked together sequentially in the amino portion of said salt.

11. A method of controlling the growth of vegetation which comprises applying to the vegetation a growth inhibiting amount of a composition containing as an essential active ingredient ethyl pentachloropentadienoate.

References Cited in the file of this patent

UNITED STATES PATENTS

| 2,393,086 | Bousquet | Jan. 15, 1946 |
| 2,618,545 | Newcomer | Nov. 18, 1952 |
| 2,642,354 | Barrons | June 16, 1953 |
| 2,649,363 | Swezey | Aug. 18, 1953 |

OTHER REFERENCES

Chemical Abstracts, vol. 43 (1949), col. 4230h.

Beilstein's "Handbuch der Organischen Chemie," 4th edition (1920), vol. II, page 482.

Zinche and Kienster, Ber. 23 (1890), page 2223.

Beilstein, "Organische Chemie," Fourth Edition, 1942, Germany (1943, United States), page 451 (Band II).